United States Patent Office 3,068,212
Patented Dec. 11, 1962

3,068,212
ORGANO TIN POLYMERIZATION CATALYST FOR ACRYLONITRILE
Lloyd T. Jenkins, Decatur, Ala., assignor, by mesne assignments, to Monsanto Chemical Company, a corporation of Delaware
No Drawing. Filed June 8, 1960, Ser. No. 34,629
6 Claims. (Cl. 260—85.5)

This invention relates to novel catalysts and a process for effecting polymerization of acrylonitrile, including copolymerization with other monomeric compounds in the presence of said novel catalysts.

It is well known that polymerization of acrylonitrile can be readily initiated by various peroxides or diazo compounds which give rise to free radicals upon decomposition, or by the use of reduction-activation methods which involve a two-stage interaction of oxidizing and reducing agents with the intermediate formation of free radicals. Among the polymerization initiators of the first mentioned type, those which have been most extensively used are hydrogen peroxide, ammonium persulfate, sodium perborate, benzoyl peroxide and azobisisobutyronitrile. In general, these and similar compounds have been found to be highly effective in promoting the polymerization of acrylonitrile to form homopolymers or copolymers with other monomers. However, the great reactivity of these compounds is highly disadvantageous in that handling of these materials is a hazardous operation and extreme caution must be exercised.

The afore-mentioned redox systems also present various difficulties when employed to induce polymerization reactions. One difficulty stems from the necessity for very careful and meticulous catalyst preparation. Slight variations in the technique of preparation of most redox catalysts, often unavoidable in production procedures, are apt to cause substantial losses in catalytic activity.

Accordingly, it is an object of this invention to provide improved agents for initiating the polymerization of acrylonitrile to form homopolymers and copolymers with other monomers, which agents do not have the shortcomings described hereinabove.

It is another object of this invention to provide methods of polymerizing acrylonitrile and monomers copolymerizable therewithin the presence of the novel catalysts of the present invention.

These and other objects of the invention are attained by the use of an organo tin hydride as the catalyst material, said organo tin hydride having the general formula:

$$R_nSnH_{n_1}$$

wherein R is a hydrocarbon radical containing from 2 to 20 atoms, $n$ is an integer of either 2 or 3 and $n_1$ is an integer of 1 or 2.

As indicated, the organo-tin hydride reactant is a tin hydride which has been substituted with two or three hydrocarbon groups. The hydrocarbon substituent may be cyclic or acyclic. Representative examples of suitable compounds are diethyl tin dihydride, dipropyl tin dihydride, dibutyl tin dihydride, tributyl tin hydride, diamyl tin dihydride, dihexyl tin dihydride, dioctyl tin dihydride, dicyclobutyl tin dihydride, dioctyl tin dihydride, diphenyl tin dihydride and triphenyl tin hydride. It has been found that dibutyl tin dihydride and diphenyl tin dihydride are especially suitable compounds.

These hydrides are high boiling, colorless liquids and are usually stable even in water. They can be prepared by known methods which are generally applicable to the whole class of compounds. For example, they can be prepared in accordance with the method set out at page 366 of "The Journal of Applied Chemistry," volume 7 (1957).

As has been indicated, the initiators provided by this invention are useful in inducing the polymerization of acrylonitrile. In addition it has been found that acrylonitrile may be copolymerized with suitable mono-olefinic monomers in the presence of the polymerization initiators of this invention to produce various copolymers. Suitable mono-olefinic monomers include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide, or monoalkyl substitution products thereof; methyl vinyl ketone, vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha, beta dicarboxylic acids or their anhydrides or derivatives, such as diethylcitraconate, diethylmesaconate, styrene, vinyl naphthalene; vinyl-substituted tertiary heterocyclic amines, such as vinyl pyridines, for example, 2-vinylpyridine, 4-vinylpyridine, 2-methyl-5 vinylpyridine, etc.; 1-vinylimidazole and alkyl-substituted 1-vinylimidazoles such as 2-, 4-, or 5-methyl-1-vinylimidazole and other olefin containing polymerizable material.

The polymerization embodying the invention is carried out in liquid phase. The nature of the liquid vehicle employed is subject to considerable variation, although it is necessary that the vehicle have a fairly high dielectric constant, i.e., in excess of 2.0 at 25° C. Among such solvents which may be employed are water, dioxane, ethylene glycol, monomethyl ether, n-butyl ether, diphenyl ether, tetrahydrofuran, acetone, benzene, ethyl benzene, isopropyl benzene and chlorobenzene. The preferred solvents are dioxane, benzene and a mixture of water and dioxane.

The polymerization should be carried out in an inert atmosphere which can be accomplished, for example, by blanketing the reaction zone with gaseous nitrogen. Either a batchwise or continuous process may be employed. The continuous processes are preferred for ecoomic reasons. Ordinarily, relatively pure monomers are employed unless copolymers are desired. When the charged mixture consists of two or more monomers, the product consists of a true copolymer of the monomers rather than a mixture of homopolymers. The quantity of initiator needed to induce polymerization is not critical; all that is required is that an effective amount be used. Some loss of activity of the initiator can be expected due to the presence of impurities that may be present in the reaction. It is, therefore, desirable to employ more than what may be considered to be trace amounts of the initiators.

The polymerization is ordinarily accomplished by merely admixing the components of the polymerization mixture, and no additional heat is necessary unless it is desired to increase the rate of polymerization or to obtain a product with a selective molecular weight or other specific properties. Excellent results may be obtained with temperatures over the range of 0° C. to 250° C., and particularly good results are obtainable in the range of 25°–175° C. Polymerization can be effected at atmospheric pressures or even lower pressures, and in some instances it may be desirable to use superatmospheric pressures in order to increase the monomer concentration in contact with the catalyst. Although the polymerization pressure may be as high as 2000 atmospheres and even higher, pressures in the range of from atmospheric to 150 atmospheres absolute are generally used. The reaction time can be varied as desired from a period of a few minutes to a number of hours. When a batch process is employed the reaction time normally used is from about 2 to 8 hours. However, when a continuous process is employed, it is not necessary to employ reaction or contact times much beyond one-half to one hour since a cyclic system can be employed involving precipitation of the polymer and return of the vehicle or solvent and unused catalyst to the charging zone wherein the catalyst can be replenished and additional monomer introduced. The amount of vehicle or solvent employed can vary over wide limits in relation to the monomer-catalyst mixture, it being only necessary that sufficient monomer be in solution at any given time to effect reaction thereof. Generally speaking, when the monomer is in higher concentration, the rate of polymerization is increased.

Following the polymerization reaction, the polymer can be separated from the catalyst and solvent by any of several well known methods. One convenient method is to treat the reaction mixture with methanol or a methanol hydrochloric acid mixture followed by a filtering and drying operation.

In order to illustrate the invention with greater particularity, the following specific examples are given, it being understood that they are intended to be only illustrative and not limitative. Parts are given by weight unless otherwise indicated.

*Example I*

To 80 parts of dry redistilled benzene in a 500 ml. round bottom flask equipped with means for agitation there were added 28 parts of dry redistilled acrylonitrile. To this solution 5 parts of diphenyl tin dihydride were added. External heat was applied and the reaction was allowed to run for 6 hours at an average temperature of 70° C. The polymer formed was isolated with methanol and recovered by filtration. There was 3 grams of polyacrylonitrile recovered.

*Example II*

To 25 ml. of dioxane there was added 3 ml. of dibutyl tin dihydride. This solution was placed in a round bottom flask equipped for mechanical agitation. To this reaction flask there was then added 25 ml. of acrylonitrile and 100 ml. of water. External heat was applied and the reaction was allowed to run for approximately 6 hours at an average temperature of 70° C. The polyacrylonitrile polymer formed was isolated with methanol and recovered by filtration.

The process of this invention may incorporate the use of antioxidants, dispersants and other features which might occur to skilled chemists. The polymers made by the process of this invention are useful in the preparation of films, fibers, filaments and molding compositions.

It is not intended that the invention be limited to the above specific examples of materials and reaction conditions, but only by the appended claims in which it is intended to claim all novelty inherent in the invention as well as all modifications coming within the spirit and scope of the invention.

I claim:

1. A process for the polymerization of acrylonitrile and a mixture of acrylonitrile and mono-ethylenically unsaturated monomers copolymerizable therewith which consists essentially of contacting the same with a catalytic amount of an organo tin hydride as the sole catalytic agent, said organo tin hydride having the general formula:

$$R_nSnH_{n_1}$$

wherein R is a hydrocarbon radical containing from 2 to 20 carbon atoms, $n$ is a whole number from 2 to 3 and $n_1$ is a whole number of from 1 to 2, and wherein said contact is made under an inert atmosphere, in the presence of a liquid solvent having a dielectric constant of at least about 2.0 at 25° C., at a temperature in the range of 0° C. to 250° C. and a pressure in the range of from 1 to 150 atmospheres.

2. The process of claim 1 wherein said organo tin hydride is dibutyl tin dihydride.

3. The process of claim 1 wherein said organo tin hydride is diphenyl tin dihydride.

4. The process of claim 1 wherein said organo tin hydride is tributyl tin hydride.

5. The process of claim 1 wherein said solvent is dioxane.

6. The process of claim 1 wherein said solvent is benzene.

References Cited in the file of this patent

UNITED STATES PATENTS 2,846,427   Findlay _____ Aug. 5, 1958

FOREIGN PATENTS 545,968   Belgium _____ Sept. 10, 1956

OTHER REFERENCES

Marvel et al.: Journal Amer. Chem. Soc., vol. 80, pages 830–831 (1958).